US008509180B2

(12) United States Patent
Maheshwari et al.

(10) Patent No.: US 8,509,180 B2
(45) Date of Patent: Aug. 13, 2013

(54) METHOD AND APPARATUS FOR EFFICIENT HANDOVER IN LTE

(75) Inventors: Shailesh Maheshwari, San Diego, CA (US); Sai Yiu Duncan Ho, San Diego, CA (US); Peter A. Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 12/433,802

(22) Filed: Apr. 30, 2009

(65) Prior Publication Data

US 2009/0286541 A1  Nov. 19, 2009

Related U.S. Application Data

(60) Provisional application No. 61/049,846, filed on May 2, 2008.

(51) Int. Cl.
*H04W 4/00* (2009.01)

(52) U.S. Cl.
USPC ............ 370/331; 370/338; 370/341; 370/348

(58) Field of Classification Search
USPC ................. 370/242, 311, 331, 336, 338, 315; 455/436
See application file for complete search history.

(56) References Cited

U.S. PATENT DOCUMENTS

| 5,722,072 A | 2/1998 | Crichton et al. |
| 2005/0259662 A1 | 11/2005 | Kim et al. |
| 2007/0047452 A1* | 3/2007 | Lohr et al. ............... 370/242 |
| 2007/0047493 A1* | 3/2007 | Park et al. ............... 370/331 |

(Continued)

FOREIGN PATENT DOCUMENTS

| EP | 1337125 | 8/2003 |
| EP | 1903820 A1 | 3/2008 |

(Continued)

OTHER PUBLICATIONS

3GPP: "3GPP TS 36.300 V8.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN) Overall Description; Stage 2 (Release 8), MBMS," (Mar. 1, 2008), pp. 1, 38-52.

(Continued)

*Primary Examiner* — Hassan Kizou
*Assistant Examiner* — Toan Nguyen
(74) *Attorney, Agent, or Firm* — Milan Patel

(57) ABSTRACT

An efficient use of downlink (DL) air-interface bandwidth during handoff of user equipment from a source cell to a target is provided. In conjunction with a handoff message to ensure receipt, expedited status exchanges are provided so that initial communications do not require a subsequent retransmission of duplicate data. A method for transmitting a dedicated Random Access Channel (RACH) preamble and cell information, receiving a RACH from the user equipment to start communication, and transmitting a handover message and a radio link control (RLC) status message or an UL grant in response to receiving the RACH is provided. Also, a method for receiving a handover message and target cell information from a source cell to start handover negotiations, initiating communication with target cell using the target cell information, receiving a handover message and (RLC) status message, and using the received information to approximate status reporting is provided.

50 Claims, 10 Drawing Sheets

(56) References Cited

U.S. PATENT DOCUMENTS

| | | | |
|---|---|---|---|
| 2007/0127415 A1 | 6/2007 | Spear | |
| 2007/0293224 A1* | 12/2007 | Wang et al. | 455/436 |
| 2008/0095116 A1* | 4/2008 | Kim et al. | 370/331 |
| 2008/0192671 A1* | 8/2008 | Torsner | 370/315 |
| 2008/0267131 A1* | 10/2008 | Kangude et al. | 370/331 |
| 2008/0273503 A1* | 11/2008 | Lee et al. | 370/336 |
| 2009/0052420 A1* | 2/2009 | Fischer | 370/338 |

FOREIGN PATENT DOCUMENTS

| | | |
|---|---|---|
| JP | 2009510887 A | 3/2009 |
| JP | 2009513086 A | 3/2009 |
| JP | 2009542100 A | 11/2009 |
| KR | 20070046698 A | 5/2007 |
| RU | 2145774 C1 | 2/2000 |
| WO | 2005109778 A1 | 11/2005 |
| WO | WO2007052922 A1 | 5/2007 |
| WO | WO2007066882 A1 | 6/2007 |
| WO | WO2007149509 A2 | 12/2007 |
| WO | WO2008023943 A1 | 2/2008 |
| WO | WO2008038093 A2 | 4/2008 |

OTHER PUBLICATIONS

Ericsson: "Enhanced Uplink for Cell-FACH State in FDD," 3GPP Draft; R1-075000, 3rd Generation Partnership Project, Mobile Competence Centre, Nov. 5-9, 2007.

Ericsson: "On the Details of the Dedicated Preamble at Intra-LTE Handover," 3GPP Draft; R2-072549, 3rd Generation Partnership Project, Mobile Competence Centre, Jun. 25-29, 2007.

International Search Report—PCT/US2009/042633—International Search Authority—European Patent Office, Apr. 8, 2010.

"Universal Mobile Telecommunications System (UMTS); Packet Data Convergence Protocol (PDCP) Specification (3GPP TS 25.323 Version 7.7.0 Release 7); ETSI TS 125.323," ETSI Standards, vol. 3-R2, No. V7.7.0, Jan. 1, 2008.

Written Opinion—PCT/US2009/042633, International Search Authority, European Patent Office, Apr. 8, 2010.

Taiwan Search Report—TW098114748—TIPO—Aug. 10, 2012.

Taiwan Search Report—TW098114748—TIPO—Dec. 3, 2012.

\* cited by examiner

METHOD AND APPARATUS FOR EFFICIENT HANDOVER IN LTE

CROSS-REFERENCE

This application claims the benefit of U.S. Provisional Application Ser. No. 61/049,846, filed May 2, 2008, entitled "AVOIDANCE OR REDUCTION OF TRANSMISSION OF DUPLICATE PDCP PDUs AFTER HANDOVER IN LTE," and assigned to the assignee hereof and the entirety of which is incorporated herein by reference.

BACKGROUND

I. Field

The present disclosure pertain to wireless communication systems, and in particular to systems in which wireless handover of a mobile communication device is necessary between a source cell and a target cell of a communication network.

Evolving communication systems such as 3GPP Long Term Evolution (LTE) address needs of increased mobility of communication devices, often referred to as user equipment (UE), within a communication network populated by overlapping cells servicing an increasing number of other UEs. Maintaining continuity of service often entails making a handoff between a source cell currently communicating with the UE, and a target cell into whose coverage area the UE is moving. If possible, the communication network facilitates a smooth handoff by having the source cell negotiate with the target cell to initiate handoff. The source cell then can provide a dedicated Random Access Channel (RACH) preamble in an uplink (UL) to the UE as part of signaling the handoff to the UE, hopefully avoiding excessive contention-resolution should the UE have to alternatively access the RACH without a dedicated preamble following a Radio Link Failure (RLF) with the source cell.

Even with this assistance, inefficiencies arise on downlink (DL) and uplink as handover and initial communications are conducted between the target cell and UE. Due to bandwidth constraints of a wireless communication channel over an air interface, it is desirable to avoid sending data transmissions, such as service data units (SDUs) on DL that are not received and have to be retransmitted. Balancing this consideration is a preference to avoid latency that can impair quality of service. Consequently, the communication network can send SDUs as soon as handover is signaled.

Complicating the situation are power constraints typical of UEs. In order to preserve battery service life, UEs often cyclically turn off their radio transmitter and radio receiver when not scheduled for transmissions with a particular network node, such as the target cell. Until status information can be exchanged between the target cell and the UE, an appropriate power level for each transmitter as well as additional scheduling synchronization may be insufficient for successful reception of SDUs.

Consequently, inefficiencies exist on the downlink. The network node (target cell) may consume DL resources unnecessarily in sending SDUs to the UE during handoff that are not received. In addition, a status message from the target cell to the UE sent after handoff may not be received by the UE that could have enhanced likelihood of successful communication. The target cell may not learn from the UE for some time which SDUs were not received until receipt of Packet Data Convergence Protocol (PDCP) status message(s) in one or more radio bearers (RB) on the uplink (UL).

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with coordinating with user equipment in conjunction with a downlink (DL) handover message from a target source for expedited status exchanges so that initial communications do not require a subsequent retransmission of duplicate data.

In one aspect, a method is provided for wireless communication handoff, transmitting a dedicated Random Access Channel (RACH) preamble and cell information, receiving a RACH to start communication, and transmitting at least one of a handover message or an uplink grant in response to receiving the RACH.

In another aspect, at least one processor is provided for wireless communication handoff, the processor is configured to transmit a dedicated Random Access Channel (RACH) preamble and cell information, receive a RACH to start communication, and transmit at least one of a handover message or an uplink grant in response to receiving the RACH.

In an additional aspect, a computer program product is provided for transmitting a dedicated Random Access Channel (RACH) preamble and cell information, for receiving a RACH to start communication, and code for transmitting at least one of a handover message or an uplink grant in response to receiving the RACH.

In another aspect, an apparatus for wireless communication handoff has means for transmitting a dedicated Random Access Channel (RACH) preamble and cell information, means for receiving a RACH to start communication, and means for transmitting at least one of a handover message or an uplink grant in response to receiving the RACH.

In one aspect, a method for wireless communication handoff includes receiving a handover message and target cell information to start handover negotiations, initiating communication with target cell using the target cell information, receiving at least one of a handover message comprising a Radio Link Control (RLC) status report or an uplink grant, and using the received information to approximate status reporting.

In another aspect, at least one processor for wireless communication handoff is configured to receive a handover message and target cell information to start handover negotiations, initiate communication with target cell using the target cell information, receive at least one of a handover message comprising a Radio Link Control (RLC) status report or an uplink grant, and use the received information to approximate status reporting.

In an additional aspect, a computer program product having code for receiving a handover message and target cell information to start handover negotiations includes code for initiating communication with target cell using the target cell information, code for receiving at least one of a handover message comprising a Radio Link Control (RLC) status report or an uplink grant, and code for using the received information to approximate status reporting.

In another additional aspect, an apparatus for wireless communication handoff has means for receiving a handover message and target cell information to start handover negotiations, means for initiating communication with target cell using the target cell information, means for receiving at least one of a handover message comprising a Radio Link Control (RLC) status report or an uplink grant, and means for using the received information to approximate status reporting.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
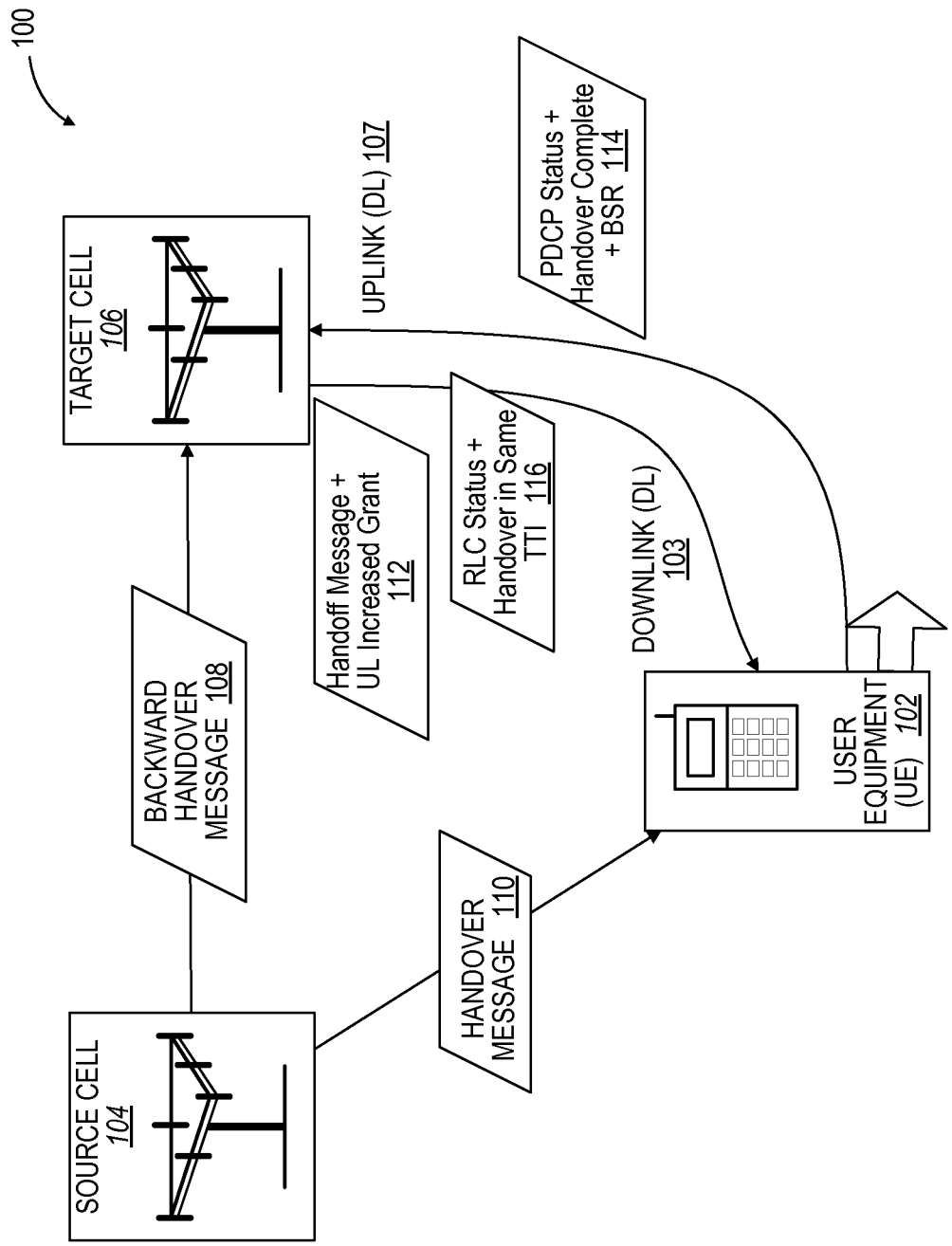
FIG. 1 illustrates a block diagram of a data packet communication system for increased handoff efficiency.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station can be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean serving as an example, instance, or illustration. Any aspect or design described herein as "exemplary" is not necessarily to be construed as preferred or advantageous over other aspects or designs.

Additionally, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Turning to the Drawings, in FIG. 1, a communication system 100 performs data packet communication between a mobile communication device, depicted as user equipment (UE) 102, and a network node. In particular, the communication system increases efficient use of air-interface bandwidth of a downlink (DL) 103 during handoff of UE 102 from a source cell (also source eNode B or eNB) 104 to a target cell (also referred to as target eNode B or eNB) 106 by using enhanced instructions for an allocation of an uplink (UL) 107. The target cell 106 sends the enhanced UL instructions to the UE 102 as part of the handover message, leveraging capability for the source cell 104 to negotiate for a "backward" handoff, depicted as backward handover message 108. In performing this backward handoff, the source cell 104 receives target cell information so that the UE 102 can acquire communications with the source cell 104 as well as a dedicated Random Access Channel (RACH) preamble for initial UL transmissions on the target cell. This approach avoids using a common RACH preamble that results in a contention-resolution process. The source cell obtains this dedicated RACH preamble, sending it along with a handoff message 110 to ensure receipt by the UE 102 before the UE 102 drops.

In responding to the dedicated RACH preamble, the target cell can send enhanced UL instructions that accompany the handover message. In one aspect depicted at 112, increased UL grant provides the UE 102 sufficient resource to provide PDCP status information. In particular, the UE is given sufficient resources to include PDCP status message(s) (one per radio bearer (RB)), handover complete message and a buffer status report (BSR), as depicted at 114, without having to neither request it nor take the otherwise longer number of cycles to complete. Otherwise, the need to avoid latency by immediately sending DL service data units (SDUs) can result in the need to resend duplicate SDUs after lengthy period. In addition, the target cell 106 may not otherwise successfully receive Packet Data Convergence Protocol (PDCP) protocol data units (PDUs) on the UL. Thereby, the need to send duplicate DL service data units (SDUs) is reduced or avoided.

In another aspect, the enhanced UL instructions can include a Radio Link Control (RLC) status message in the same transmission time interval (TTI) with the handover message as depicted at 116 to increase the likelihood of receipt and use by the UE. Otherwise, once the handover message (without the RLC status message included in it) is successfully received by the UE, the UE 102 may not look at any subsequent messages at all since the UE will process the handover message, stop communicating with the source cell, and start the Random access procedures with the target cell.

It should be appreciated with the benefit of the present disclosure that techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA is part of Universal Mobile Telecommunication System (UMTS). E-UTRA is part of the 3GPP Long Term Evolution, an upcoming release of 3GPP, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Figure 2:
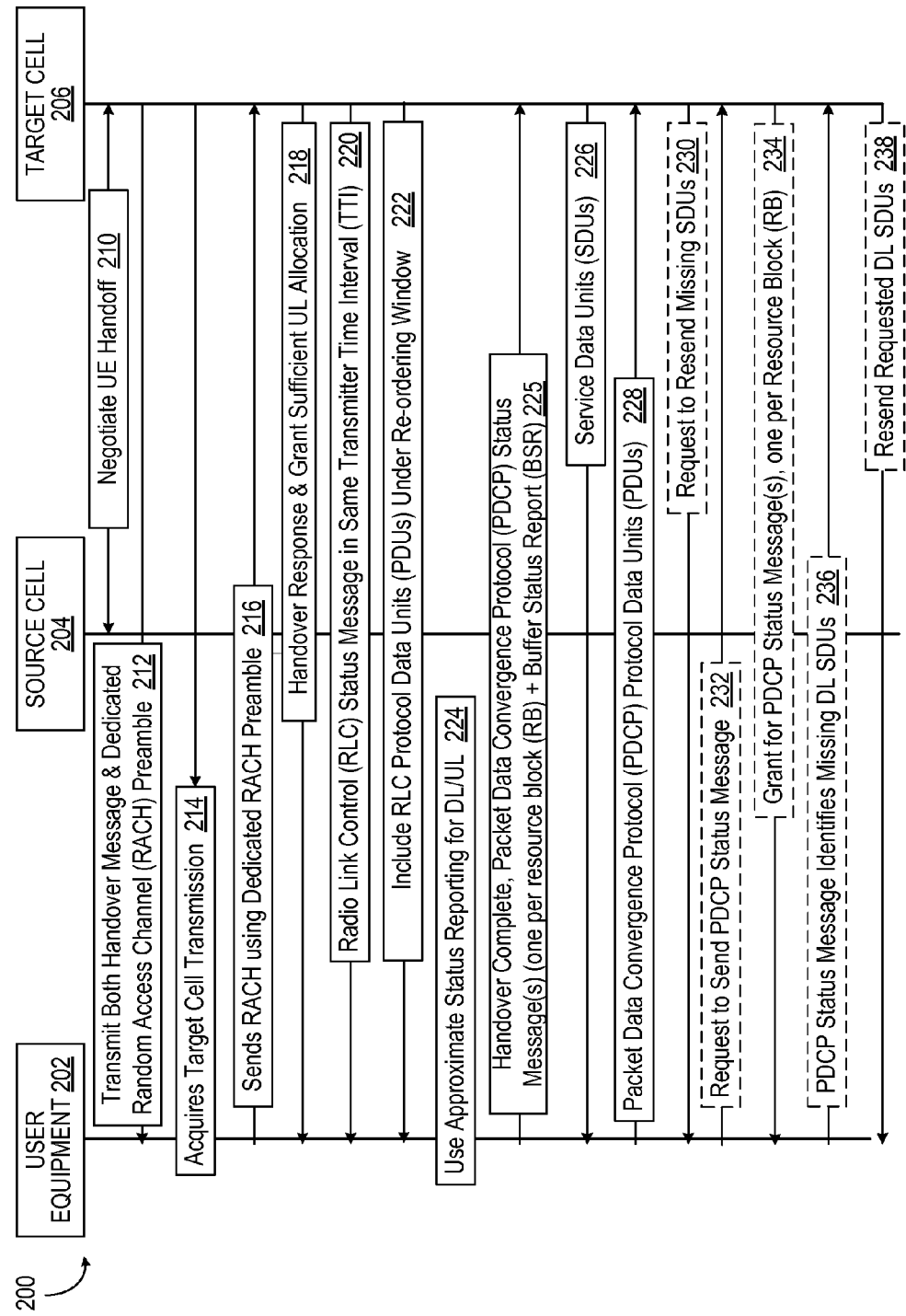
FIG. 2 illustrates a timing diagram of communication between a mobile communication device (user equipment) a source cell and a target cell to perform a handoff.
Figure 3:
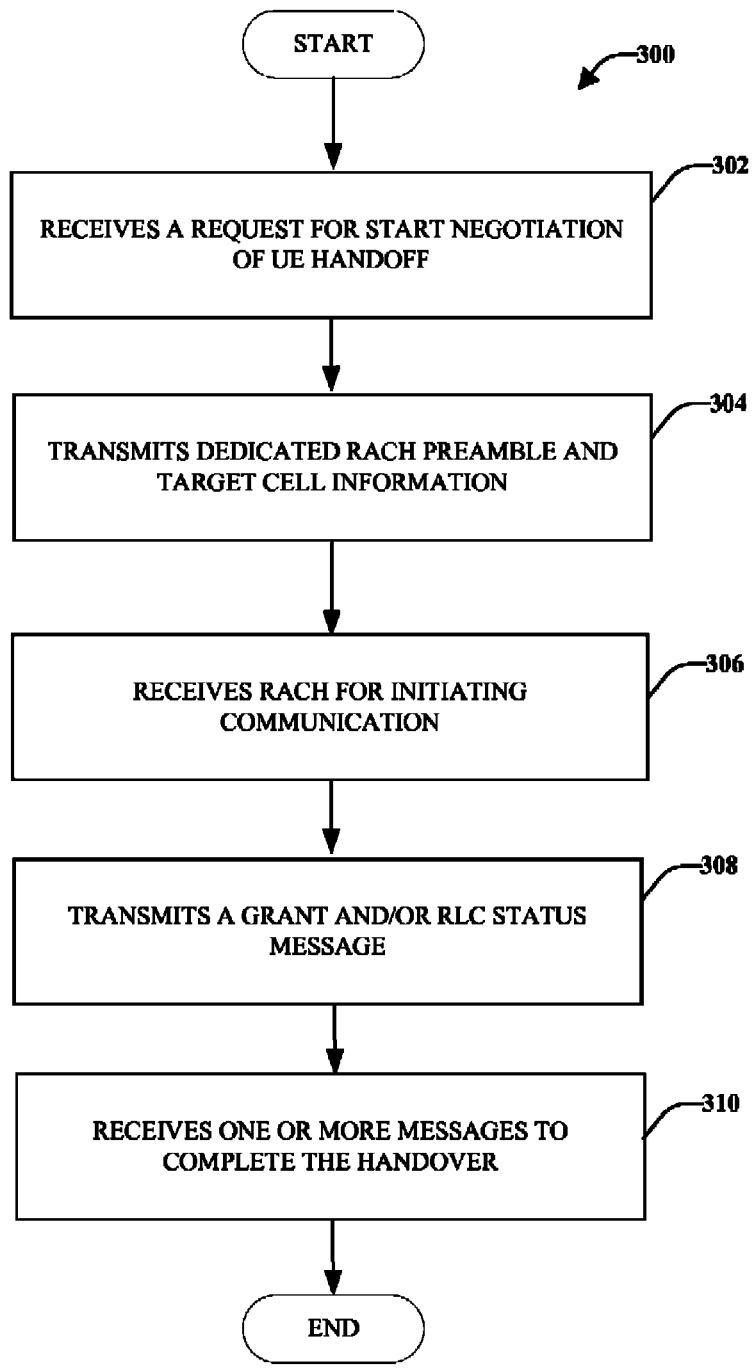
FIG. 3 illustrates a sample methodology for efficient transmission during handover used by the target cell.
Figure 4:
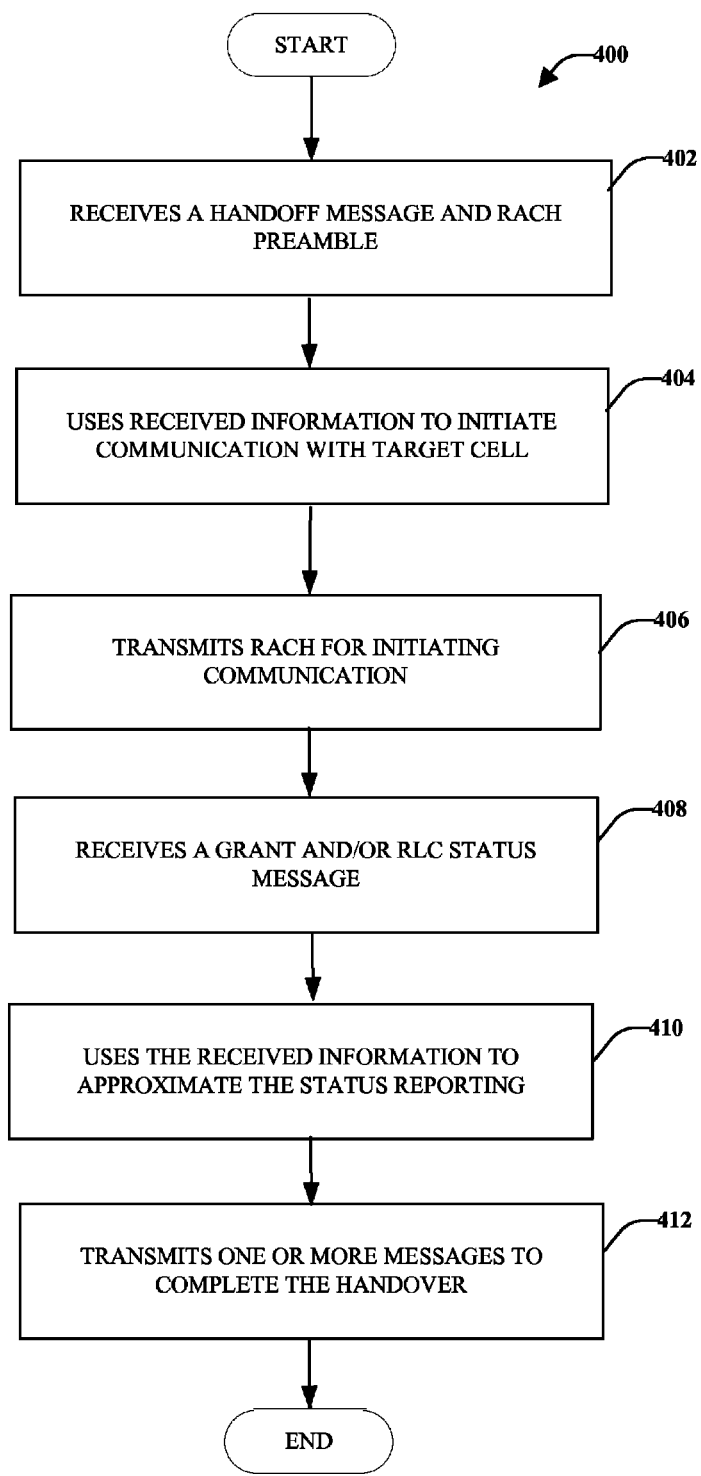
FIG. 4 a sample methodology for efficient transmission during handover used by the user equipment.

FIG. 2-4 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 is an exemplary timing diagram of a methodology 200 for avoiding or reducing contention-resolution at a target cell during handoff of a UE 202 from a source cell 204 to a target cell 206. In block 210, the source cell 204 initiates negotiating the handoff with the target cell 206, receiving dedicated RACH preamble and target cell information. In block 212, the source cell 204 transmits this dedicated RACH preamble and target cell information along with the handoff message to the UE 202. The UE 202 benefits from target cell information in acquiring the target cell 206 in block 214, and uses the dedicated RACH preamble in using the RACH in block 216 to initiate communication with the target cell 206.

Advantageously, in block 218 the target cell 206 responds by granting sufficient UL resource allocation for the UE 202 along with the handover response. In block 220, the target cell 206 sends a Radio Link Control (RLC) status message in the same transmitter time interval (TTI). In block 222, the target cell 206 chooses to include RLC PDUs that are under re-ordering window as well for the RLC status message send with the handover message. Thereby, the handover message/procedure triggers.

In block 224, the UE 202 uses this information from blocks 218, 220, 222 to determine approximate status reporting on the DL and UL. In particular, in block 225, the higher UL grant is used by the UE 202 for expeditiously sending the handover complete message, Packet Data Convergence Protocol (PDCP) Status Message(s) (one per radio bearer (RB)), and Buffer Status Report (BSR). With this early exchange of status information, the Service Data Units (SDUs) sent on the downlink at block 226 and the PDCP PDUs on the UL at block 228 are received successfully or at least with reduced losses.

These efficiencies are depicted at block 230 as being able to avoid a request to resend missing SDUs on the DL. The need for the UE 202 to request to send PDCP status message in block 232 is mitigated, as well as subsequent grant in block 234 on the DL followed by the PDCP status message, identifying missing DL SDUs in block 236 on the UL. Finally, the increased latency and number of duplicate DL SDUs is avoided or mitigated, as depicted at 238.

Turning specifically to FIG. 3, an example methodology 300 employed by the eNB (for example, cell 104 or 106) that facilitates efficient transmission during handover in wireless communication system according to an aspect is illustrated. The method starts at 302, the method receives a request from the source cell 204 to initiate negotiating UE handoff with UE. The method at 304, transmits dedicated random access channel (RACH) preamble and target cell information to source cell. The method at 306, receives the RACH based on the dedicated RACH preamble for initiating communication from UE. According to an aspect, the method at 308, transmits an UL grant comprising size of UL resource allocation, wherein UL resource allocation is of a sufficient size to allow UE to transmit PDCP status message over one or more configured data radio bearers (DRBs), and a Buffer Status Report (BSR). In an aspect, the size of the UL grant may be computed based on the number of PDCP PDUs, across all configured data radio bearers (DRBs), sitting in PDCP to RLC queue or number of PDCP packets forwarded from the source cell. In another aspect, the size may be computed based on signaling information between source cell and target cell about the number of forwarded PDCP packets which were actually transmitted. In another aspect, the method at 308, for each UE sending RACH based on the transmitted dedicated RACH preamble, the eNB identifies those UEs as handover UEs. The method at 308, provides higher (e.g., extra) number of grants to all the UE's identified as handover UEs to allow for transmitting the PDCP status message and BSR without the UE requesting additional grants. In another aspect, method at 308, transmits a handover message comprising RLC status message (i.e. report). The RLC PDUs that are under re-ordering window as well as RLC status message are sent with the handover message. Thus, in an aspect, the handover message/procedures triggers RLC status message from network side that will override any RLC status prohibit timer from running on the network side. This provides a method to notify the UE that the latest information about which UL RLC PDUs have been received so that when UE switches to the target cell, the UE can start retransmitting RLC PDUs starting with the oldest one not received at the source cell. In an aspect, the UL grant and handover message comprising the RLC Status report may be transmitted in the same TTI. The method at 310, receives a handover complete message, PDCP status messages, one per radio bearer (RB), and one or more Buffer Status Report to complete the handover.

Turning specifically to FIG. 4, an example methodology 400 employed by the UE that facilitates efficient transmission during handover in wireless communication system according to an aspect is illustrated. The method starts at 402, the method receives a handoff message and RACH preamble to UE 202 from the source cell 204, therein to began the handover to the target cell. The method at 404, uses target cell information in acquiring the target cell 206 in block 214 and uses the dedicated RACH preamble to initiate communication. The method at 406, transmits RACH derived from the dedicated RACH preamble to initiate communications. The method at 408, provides for receiving the grant of UL allocation and/or the handover message comprising RLC status message and RLC PDUs. The method at 410, uses this information received at 408 to determine approximate status reporting on the downlink and uplink. The method at 412, transmits a handover complete message, PDCP status messages, one per radio bearer (RB), and one or more Buffer Status Report to complete the handover.

Figure 5:
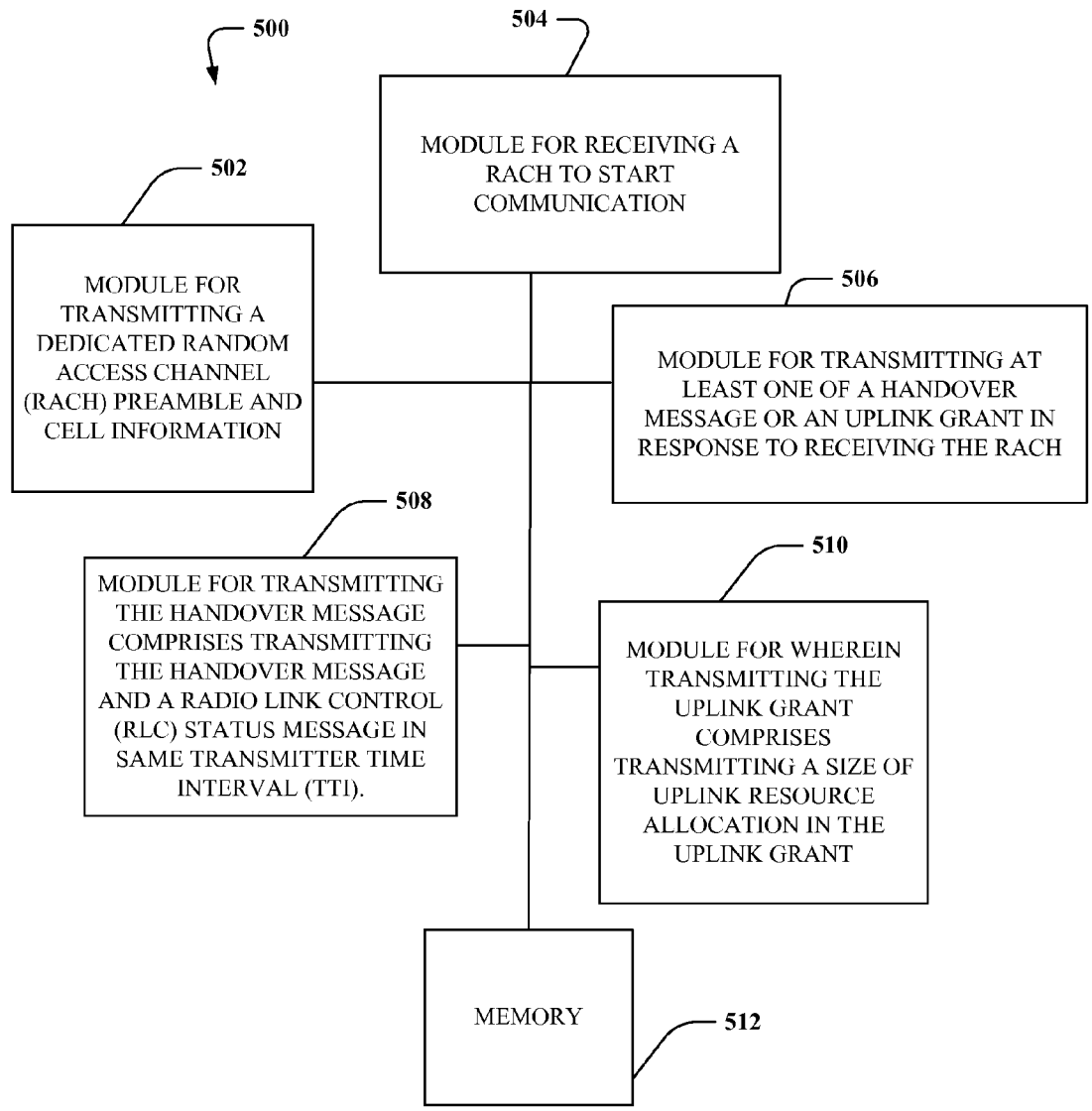
FIG. 5 depicts an exemplary system that facilitates avoidance or reduction of transmission of duplicate PDCP PDU's in accordance with various aspects employed by a cell.

Referring now to FIG. 5, a system 500 that facilitates avoidance or reduction of transmission of duplicate PDCP PDU's a wireless communication is illustrated. System 500 can include a module 502 for transmitting a dedicated Random Access Channel (RACH) preamble and cell information; a module 504 for receiving a RACH to start communication; a module 506 for transmitting at least one of a handover message or an uplink grant in response to receiving the RACH; a module 508 for transmitting the handover message comprises transmitting the handover message and a radio link control (RLC) status message in same transmitter time interval (TTI); and a module 510 for transmitting the uplink grant comprises transmitting a size of uplink resource allocation in the uplink grant. Modules 502-510 may be a processor or any electronic device and may be coupled to memory module 512.

Figure 6:
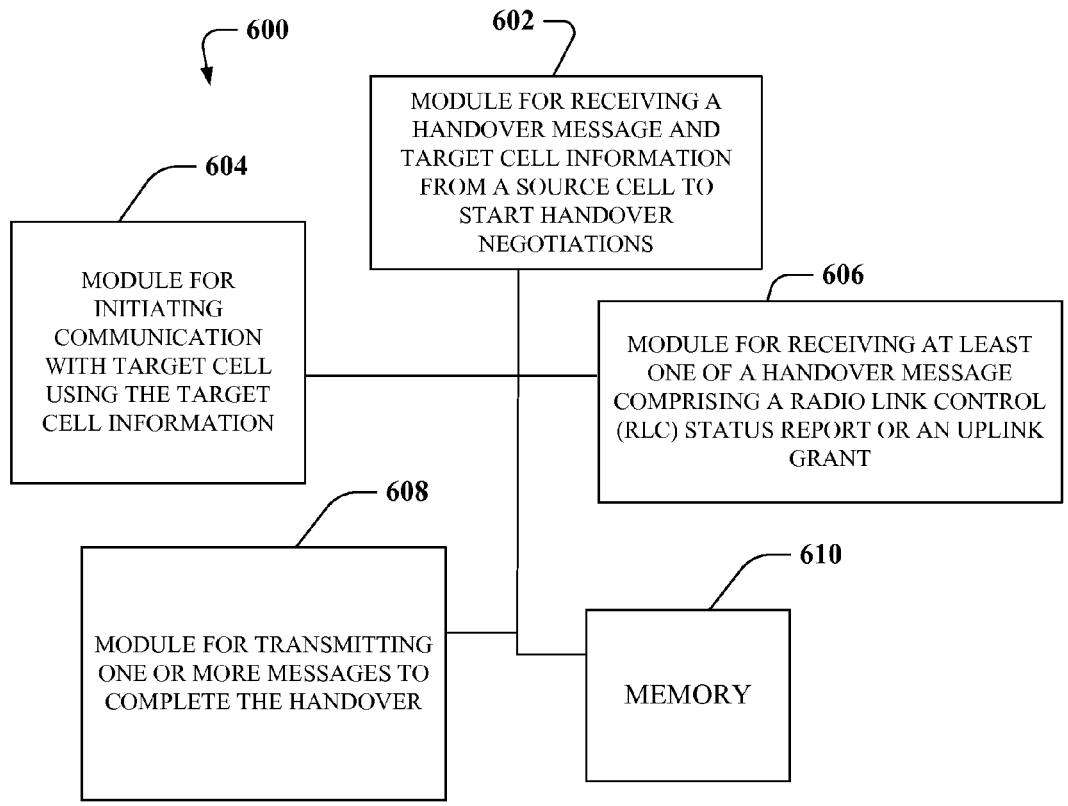
FIG. 6 depicts an exemplary system that facilitates avoidance or reduction of transmission of duplicate PDCP PDU's in accordance with various aspects employed by user equipment.

Referring now to FIG. 6, a system 600 that facilitates avoidance or reduction of transmission of duplicate PDCP PDU's a wireless communication is illustrated. System 600 can include a module 602 for receiving a handover message and target cell information from a source cell to start handover negotiations; a module 604 for initiating communication with target cell using the target cell information; a module 606 for receiving at least one of a handover message comprising a Radio Link Control (RLC) status report or an uplink grant; and a module 608 for transmitting one or more messages to complete the handover. Modules 602-68 may be a processor or any electronic device and can be coupled to memory module 610.

Figure 7:
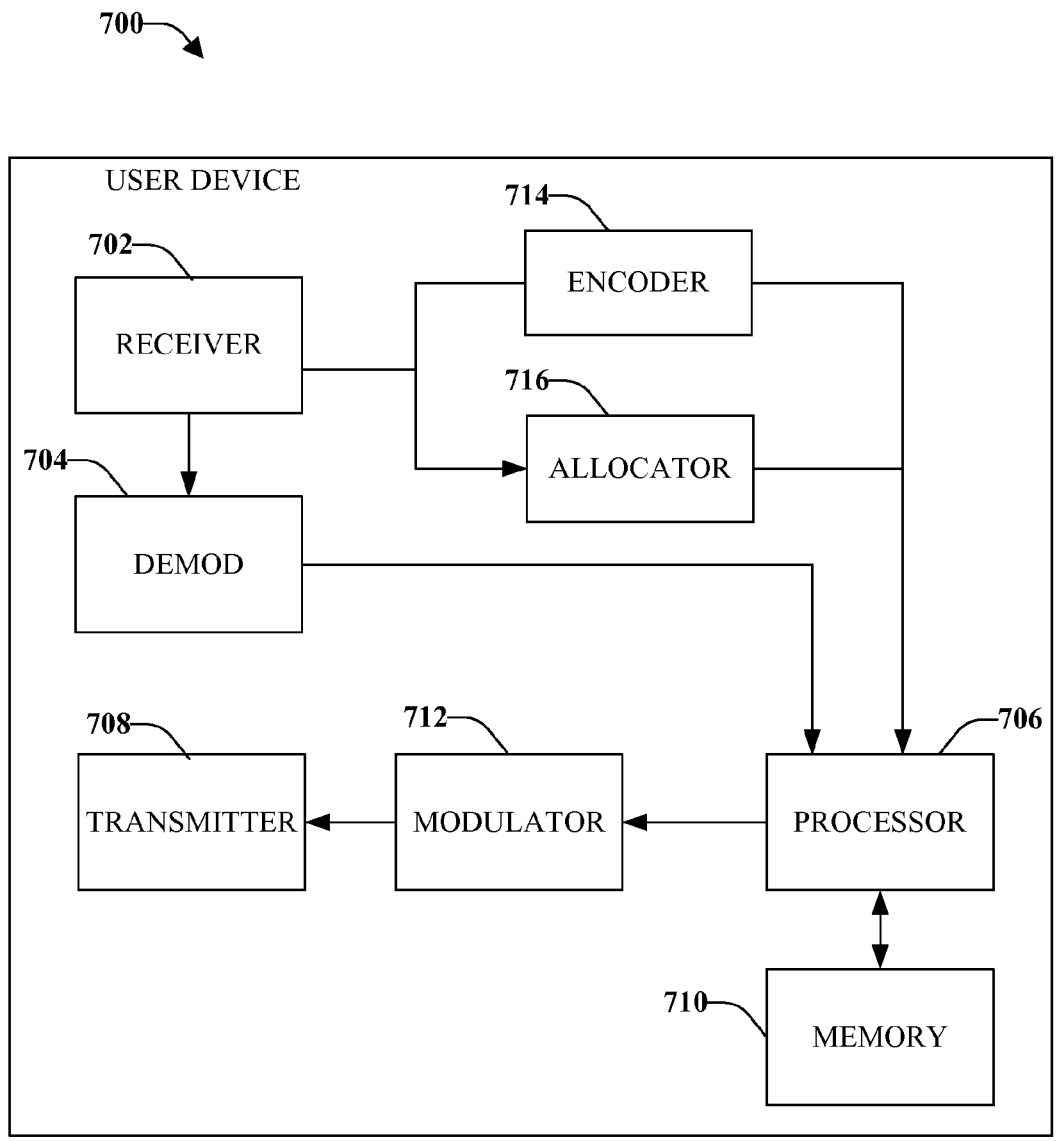
FIG. 7 is an illustration of a user equipment that facilitates avoidance or reduction of transmission of duplicate PDCP PDU's in accordance with various aspects presented herein.

With reference now to FIG. 7, illustrated is a system 700 that facilitates avoidance or reduction of transmission of duplicate PDCP PDU's in accordance with various aspects presented herein. System 700 can reside in a user device. System 700 comprises a receiver 702 that can receive a signal from, for example, a receiver antenna. The receiver 702 can perform typical actions thereon, such as filtering, amplifying, downconverting, etc. the received signal. The receiver 702 can also digitize the conditioned signal to obtain samples. A demodulator 704 can obtain received symbols for each symbol period, as well as provide received symbols to a processor 706.

Processor 706 can be a processor dedicated to analyzing information received by receiver component 702 and/or generating information for transmission by a transmitter 708. In addition or alternatively, processor 706 can control one or more components of user device 700, analyze information received by receiver 702, generate information for transmission by transmitter 708, and/or control one or more components of user device 700. Processor 706 may include a controller component capable of coordinating communications with additional user devices.

User device 700 can additionally comprise memory 708 operatively coupled to processor 706 and that can store information related to coordinating communications and any other suitable information. Memory 710 can additionally store protocols associated with maximizing the Euclidean distance. User device 700 can further comprise a symbol modulator 712 and a transmitter 708 that transmits the modulated signal.

Figure 8:
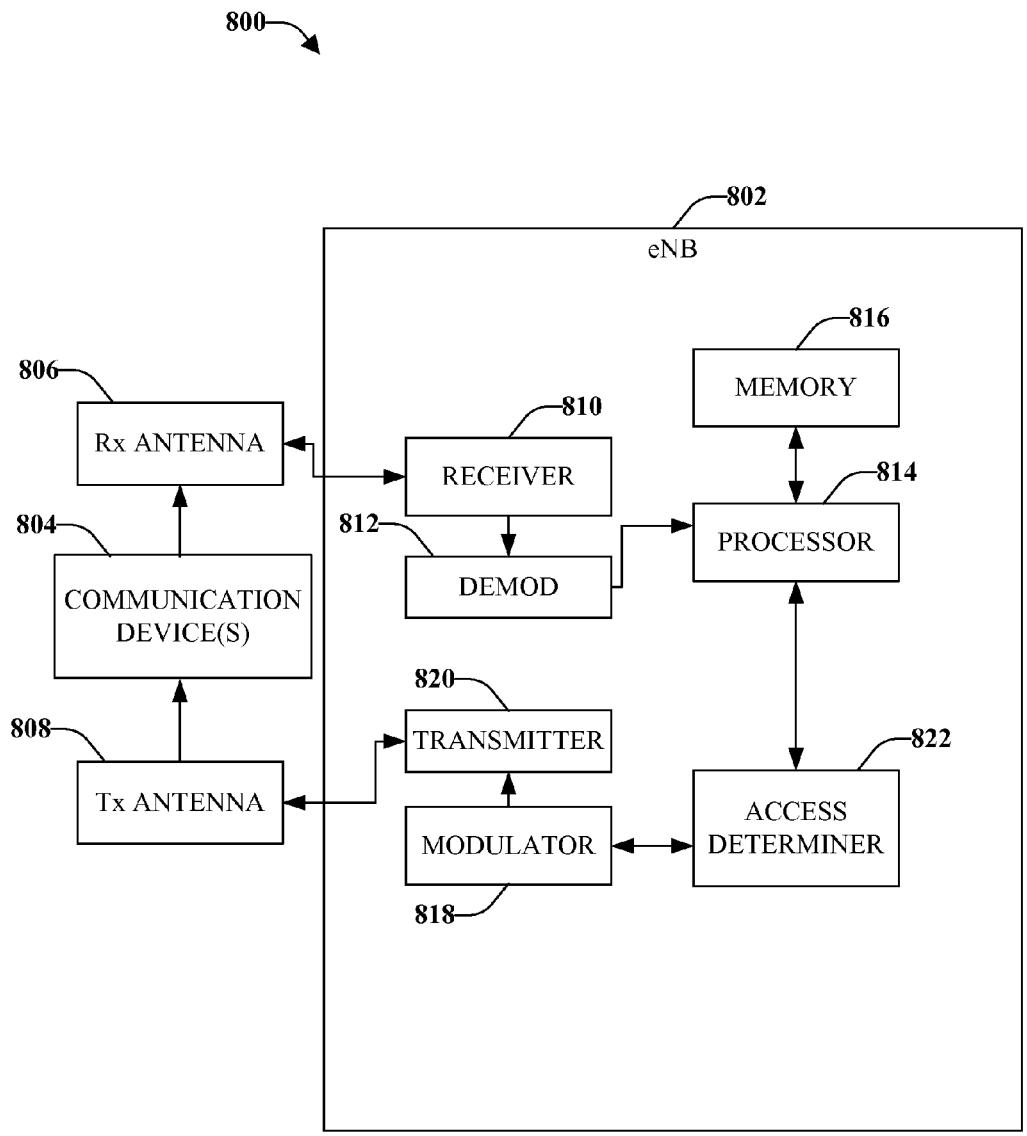
FIG. 8 is an illustration of a base station (eNB) that facilitates avoidance or reduction of transmission of duplicate PDCP PDU's in accordance with various aspects presented herein.

FIG. 8 is an illustration of a system 800 that facilitates avoidance or reduction of transmission of duplicate PDCP PDU's in accordance with various aspects presented herein. System 800 comprises a base station or access point 802. As illustrated, base station 802 receives signal(s) from one or more communication devices 804 (e.g., user device) by a receive antenna 806, and transmits to the one or more communication devices 804 through a transmit antenna 808.

Base station 802 comprises a receiver 810 that receives information from receive antenna 806 and is operatively associated with a demodulator 812 that demodulates received information. Demodulated symbols are analyzed by a processor 814 that is coupled to a memory 816 that stores information related to maximizing a Euclidean distance. A modulator 818 can multiplex the signal for transmission by a transmitter 820 through transmit antenna 808 to communication devices 804.

Figure 9:
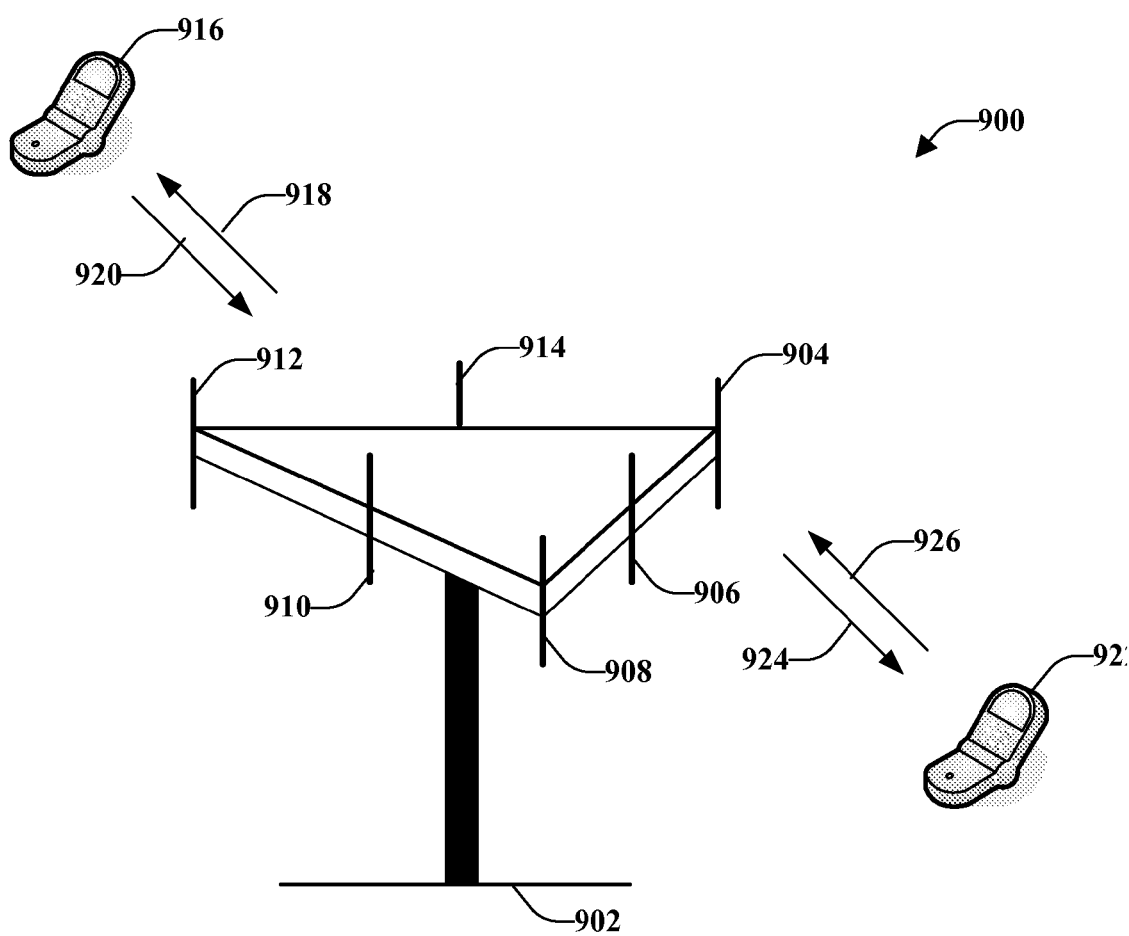
FIG. 9 illustrates a multiple access wireless communication system according to one or more aspects.

Referring now to FIG. 9, a multiple access wireless communication system 900 according to one or more aspects is illustrated. A wireless communication system 900 can include one or more base stations in contact with one or more user devices. Each base station provides coverage for a plurality of sectors. A three-sector base station 902 is illustrated that includes multiple antenna groups, one including antennas 904 and 906, another including antennas 908 and 910, and a third including antennas 912 and 914. According to the figure, only two antennas are shown for each antenna group, however, more or fewer antennas may be utilized for each antenna group. Mobile device 916 is in communication with antennas 912 and 914, where antennas 912 and 914 transmit information to mobile device 916 over forward link 918 and receive information from mobile device 916 over reverse link 920. Forward link (or downlink) refers to the communication link from the base stations to mobile devices, and the reverse link (or uplink) refers to the communication link from mobile devices to the base stations. Mobile device 922 is in communication with antennas 904 and 906, where antennas 904 and 906 transmit information to mobile device 922 over forward link 924 and receive information from mobile device 922 over reverse link 926. In a FDD system, for example, communication links 918, 920, 924, and 926 might utilize different frequencies for communication. For example, forward link 918 might use a different frequency than the frequency utilized by reverse link 920.

Each group of antennas and/or the area in which they are designated to communicate may be referred to as a sector of base station 902. In one or more aspects, antenna groups each are designed to communicate to mobile devices in a sector or the areas covered by base station 902. A base station may be a fixed station used for communicating with the terminals.

In communication over forward links 918 and 924, the transmitting antennas of base station 902 can utilize beamforming in order to improve a signal-to-noise ratio of forward links for the different mobile devices 916 and 922. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

Figure 10:
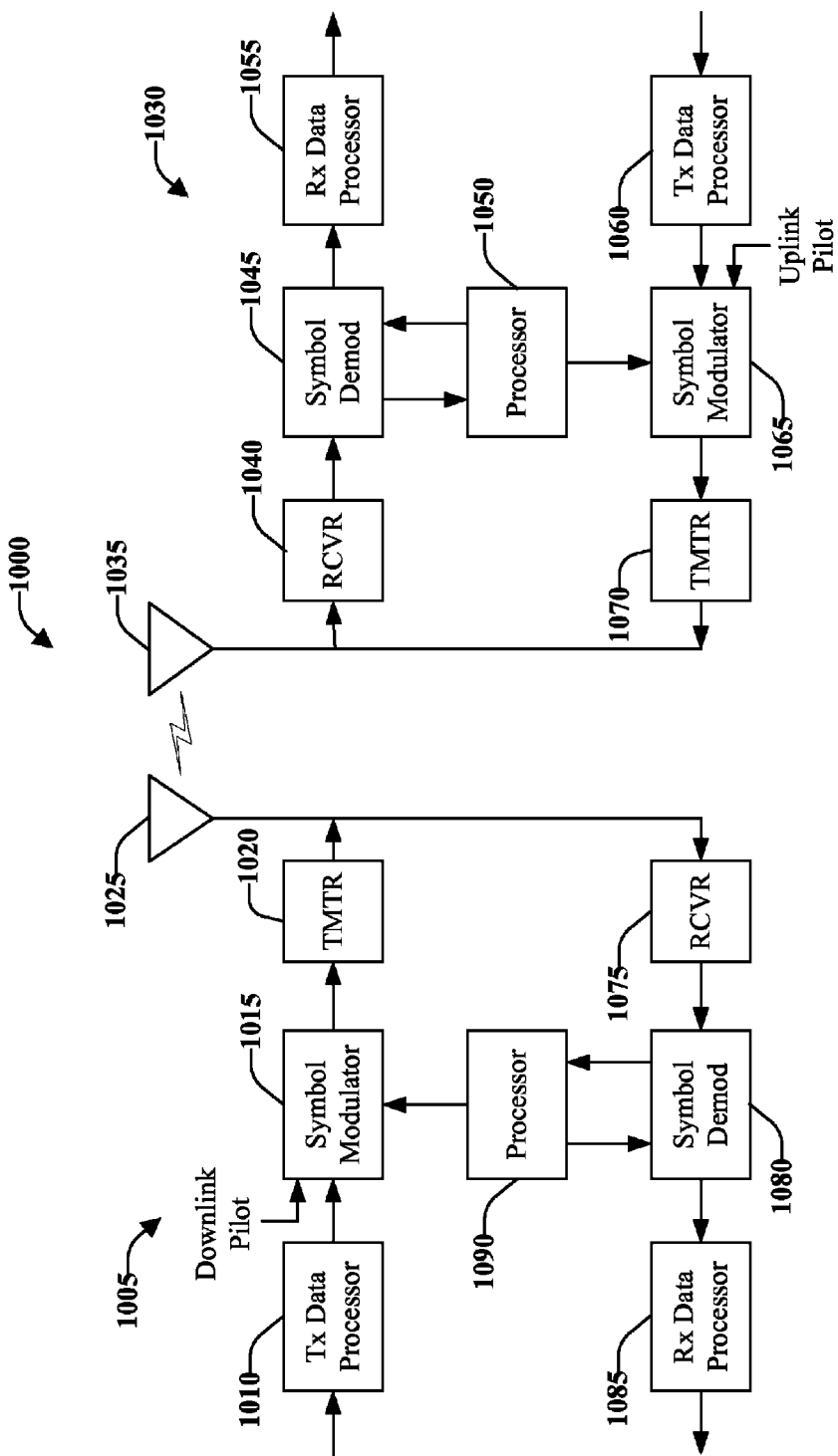
FIG. 10 illustrates an exemplary wireless communication system, according to various aspects.

FIG. 10 illustrates an exemplary wireless communication system 1000, according to various aspects. Wireless communication system 1000 depicts one base station and one terminal for sake of brevity. However, it is to be appreciated that system 1000 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1015 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 obtains N received symbols and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink.

Processors 1090 and 1050 direct (e.g., control, coordinate, manage, . . . ) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for wireless communication handoff, the method comprising:
    transmitting, by a target cell, a dedicated Random Access Channel (RACH) preamble and cell information to a source cell;
    receiving, at the target cell, a RACH communication from a user equipment (UE) comprising the dedicated RACH preamble to start communication with the target cell; and
    transmitting, by the target cell, an uplink grant accompanying a handover message in response to receiving the RACH communication, wherein transmitting the uplink grant comprises allocating uplink resources based on a number of Packet Data Convergence Protocol (PDCP) Protocol Data Units (PDUs) for one or more configured Data Radio Bearers (DRBs) in a PDCP queue to allow for receiving a PDCP status message for the one or more configured DRBs and a Buffer Status Report (BSR).

2. The method of claim 1, further comprising receiving a Packet Data Convergence Protocol (PDCP) status message and a Buffer Status Report (BSR) on the allocated uplink resources.

3. The method of claim 2, further comprising sending service data units (SDUs) based, at least in part, on the PDCP status message to reduce sending duplicate SDUs.

4. The method of claim 1, further comprising transmitting a Radio Link Control (RLC) status message in same Transmitter Time Interval (TTI) as the handover message.

5. The method of claim 1, further comprising receiving a request to start handoff negotiation prior to transmitting the dedicated Random Access Channel (RACH) preamble.

6. The method of claim 1, wherein the number of PDCP PDUs for the one or more DRBs is based on a number of PDCP PDUs in a PDCP queue of the target cell.

7. The method of claim 1, wherein the number of PDCP PDUs for the one or more DRBs is based on a number of PDCP PDUs forwarded to the target cell from the source cell.

8. An apparatus for wireless communication handoff, the apparatus comprising:
    means for transmitting a dedicated Random Access Channel (RACH) preamble and cell information;
    means for receiving a RACH communication from a user equipment (UE) comprising a dedicated preamble to start communication with the apparatus; and
    means for transmitting an uplink grant accompanying a handover message in response to receiving the RACH communication, wherein the means for transmitting the uplink grant comprises means for allocating uplink resources based on a number of Packet Data Convergence Protocol (PDCP) Protocol Data Units (PDUs) for one or more configured Data Radio Bearers (DRBs) in a PDCP queue to allow for receiving a PDCP status message for the one or more configured DRBs and a Buffer Status Report (BSR).

9. The apparatus of claim 8, further comprising means for receiving a Packet Data Convergence Protocol (PDCP) status message and a Buffer Status Report (BSR) on the allocated uplink resources.

10. The apparatus of claim 9, further comprising means for sending a service data units (SDUs) based, at least in part, on the PDCP status message to reduce sending duplicate SDUs.

11. The apparatus of claim 8, further comprising means for transmitting a Radio Link Control (RLC) status message in same Transmitter Time Interval (TTI) as the handover message.

12. The apparatus of claim 8, further comprising means for receiving a request to start handoff negotiation prior to transmitting the dedicated Random Access Channel (RACH) preamble.

13. The apparatus of claim 8, wherein the number of PDCP PDUs for the one or more DRBs is based on a number of PDCP PDUs in a PDCP queue of the apparatus.

14. The apparatus of claim 8, wherein the number of PDCP PDUs for the one or more DRBs is based on a number of PDCP PDUs forwarded to the apparatus form a source cell.

15. An apparatus for wireless communication handoff, the apparatus comprising:
    at least one processor configured to
    transmit a dedicated Random Access Channel (RACH) preamble and cell information;
    receive a RACH communication from a user equipment (UE) comprising a dedicated preamble to start communication with the apparatus; and
    transmit at least one of a handover message or an uplink grant in response to receiving the RACH, wherein the processor configured to allocate uplink resources based on a number of Packet Data Convergence Protocol (PDCP) Protocol Data Units (PDUs) for one or more configured Data Radio Bearers (DRBs) in a PDCP queue to allow for receiving a PDCP status message for the one or more configured DRBs and a Buffer Status Report (BSR).

16. The apparatus of claim 15, further comprising the processor configured to receive a Packet Data Convergence Protocol (PDCP) status message and a Buffer Status Report (BSR) on the allocated uplink resources.

17. The apparatus of claim 15, wherein the number of PDCP PDUs for the one or more DRBs is based on a number of PDCP PDUs in a PDCP queue of the apparatus.

18. The apparatus of claim 15, wherein the number of PDCP PDUs for the one or more DRBs is based on a number of PDCP PDUs forwarded to the apparatus from a source cell.

19. A computer program product, comprising:
a non-transitory computer-readable medium comprising:
code for transmitting a dedicated Random Access Channel (RACH) preamble and cell information;
code for receiving a RACH communication from a user equipment (UE) comprising a dedicated preamble to start communication with the apparatus; and
code for transmitting at least one of a handover message or an uplink grant in response to receiving the RACH, wherein code for transmitting the uplink grant comprises allocating uplink resources based on a number of Packet Data Convergence Protocol (PDCP) Protocol Data Units (PDUs) for one or more configured Data Radio Bearers (DRBs) in a PDCP queue to allow for receiving a PDCP status message for the one or more configured DRBs and a Buffer Status Report (BSR).

20. The computer program product of claim 19, further comprising code for receiving a Packet Data Convergence Protocol (PDCP) status message and a Buffer Status Report (BSR) on the allocated uplink resources.

21. A method for wireless communication handoff, the method comprising:
receiving target cell information to start handover negotiations;
initiating communication with a target cell using the target cell information;
receiving an uplink grant accompanying a handover message from the target cell, wherein the uplink grant comprises an allocation of uplink resources based on a number of Packet Data Convergence Protocol (PDCP) Protocol Data Units (PDUs) for one or more configured Data Radio Bearers (DRBs) in a PDCP queue to allow for transmitting a PDCP status message for the one or more configured DRBs and a Buffer Status Report (BSR); and
using the received information to approximate status reporting.

22. The method of claim 21, further comprising:
transmitting a Packet Data Convergence Protocol (PDCP) status message and the Buffer Status Report (BSR) on the allocated uplink resources; and
receiving a service data units (SDUs) on a downlink, the SDUs based, at least in part, on the PDCP status message.

23. The method of claim 21, wherein initiating communication comprises transmitting a dedicated preamble on a Random Access Channel (RACH) to start communication with the target cell.

24. The method of claim 21, further comprising transmitting one or more messages to complete the handover.

25. The method of claim 24, wherein transmitting one or more messages comprises transmitting a Packet Data Convergence Protocol (PDCP) status message and a Buffer Status Report (BSR).

26. An apparatus for wireless communication handoff, the apparatus comprising:
means for receiving target cell information to start handover negotiations;
means for initiating communication with a target cell using the target cell information;
means for receiving an uplink grant accompanying a handover message from the target cell, wherein the uplink grant comprises an allocation of uplink resources based on a number of Packet Data Convergence Protocol (PDCP) Protocol Data Units (PDUs) for one or more configured Data Radio Bearers (DRBs) in a PDCP queue to allow for transmitting a PDCP status message for the one or more configured DRBs and a Buffer Status Report (BSR); and
means for using the received information to approximate status reporting.

27. A computer program product, comprising:
a non-transitory computer-readable medium comprising:
code receiving target cell information to start handover negotiations;
code for initiating communication with target cell using the target cell information;
code for receiving an uplink grant accompanying a handover message, wherein the uplink grant comprises allocating uplink resources based on a number of Packet Data Convergence Protocol (PDCP) Protocol Data Units (PDUs) for one or more configured Data Radio Bearers (DRBs) in a PDCP queue to allow for transmitting a PDCP status message for the one or more configured DRBs and a Buffer Status Report (BSR); and
code for using the received information to approximate status reporting.

28. An apparatus for wireless communication handoff, the apparatus comprising:
at least one processor configured to
receive target cell information to start handover negotiations;
initiate communication with a target cell using the target cell information; receive at least one of a handover message comprising a Radio Link Control (RLC) status report or an uplink grant, wherein the uplink grant comprises allocating uplink resources of based on a number of Packet Data Convergence Protocol (PDCP) Protocol Data Units (PDUs) for one or more configured Data Radio Bearers (DRBs) to allow for transmitting a PDCP status message for the one or more configured DRBs and a Buffer Status Report (BSR); and
use the received information to approximate status reporting.

29. A method for wireless communication handoff, the method comprising:
transmitting, by a target cell, a dedicated Random Access Channel (RACH) preamble and cell information to a source cell;
receiving, at the target cell, a RACH communication from a user equipment (UE) comprising the dedicated RACH preamble to start communication with the target cell; and
transmitting, by the target cell, a handover message in response to receiving the RACH, wherein transmitting the handover message comprises transmitting the handover message and a radio link control (RLC) status message in a same transmitter time interval (TTI).

30. The method of claim 29, further comprising sending RLC Protocol Data Units (PDUs) to trigger the RLC status message by overriding any RLC status prohibit timer.

31. The method of claim 29, further comprising notifying the UE about uplink RLC Protocol Data Units (PDUs) after transmission of the RLC status message.

32. The method of claim 29, wherein transmitting the handover message comprises allocating uplink resources, the method further comprising receiving a Packet Data Convergence Protocol (PDCP) status message and a Buffer Status Report (BSR).

33. An apparatus for wireless communication handoff, the apparatus comprising:
means for transmitting a dedicated Random Access Channel (RACH) preamble and cell information;
means for receiving a RACH communication from a user equipment (UE) comprising a dedicated preamble to start communication with the apparatus; and
means for transmitting a handover message in response to receiving the RACH communication, wherein the means for transmitting the handover message comprise means for transmitting the handover message and a radio link control (RLC) status message in a same transmitter time interval (TTI).

34. The apparatus of claim 33, further comprising means for sending RLC Protocol Data Units (PDUs) to trigger the RLC status message by overriding any RLC status prohibit timer.

35. The apparatus of claim 33, further comprising means for notifying the UE about uplink RLC Protocol Data Units (PDUs) after transmission of the RLC status message.

36. The apparatus of claim 33, wherein the means for transmitting the handover message comprises means for allocating uplink resources, the apparatus further comprising means for receiving a Packet Data Convergence Protocol (PDCP) status message and a Buffer Status Report (BSR).

37. An apparatus for wireless communication handoff, the apparatus comprising:
at least one processor configured to:
transmit a dedicated Random Access Channel (RACH) preamble and cell information;
receive a RACH communication from a user equipment (UE) comprising a dedicated preamble to start communication with the apparatus; and
transmit a handover message in response to receiving the RACH communication, wherein the processor configured to transmit the handover message and a radio link control (RLC) status message in a same transmitter time interval (TTI).

38. The apparatus of claim 37, wherein the at least one processor is further configured to send RLC Protocol Data Units (PDUs) to trigger the RLC status message by overriding any RLC status prohibit timer.

39. The apparatus of claim 37, wherein the at least one processor is further configured to notify the UE about uplink RLC Protocol Data Units (PDUs) after transmission of the RLC status message.

40. The apparatus of claim 37, wherein the configuration of the at least one processor to transmit the handover message comprises configuration to allocate uplink resources, wherein the at least one processor is further configured to receive a Packet Data Convergence Protocol (PDCP) status message and a Buffer Status Report (BSR) on the allocated uplink resources.

41. A computer program product, comprising:
a non-transitory computer-readable medium comprising:
code for transmitting a dedicated Random Access Channel (RACH) preamble and cell information;
code for receiving a RACH communication from a user equipment (UE) comprising a dedicated preamble to start communication with the apparatus; and
code for transmitting a handover message in response to receiving the RACH, wherein code for transmitting the handover message comprises code for transmitting the handover message and a radio link control (RLC) status message in a same transmitter time interval (TTI).

42. The computer program product of claim 41, further comprising program code for sending RLC Protocol Data Units (PDUs) to trigger the RLC status message by overriding any RLC status prohibit timer.

43. The computer program product of claim 41, further comprising program code for notifying the UE about uplink RLC Protocol Data Units (PDUs) after transmission of the RLC status message.

44. The computer program product of claim 41, further comprising program code for receiving a Packet Data Convergence Protocol (PDCP) status message and a Buffer Status Report (BSR) on the allocated uplink resources.

45. A method for wireless communication handoff, the method comprising:
receiving target cell information to start handover negotiations;
initiating communication with a target cell using the target cell information;
receiving a handover message comprising a Radio Link Control (RLC) status report in a same transmitter time interval (TTI); and
using the received information to approximate status reporting.

46. The method of claim 45, further comprising:
transmitting a Packet Data Convergence Protocol (PDCP) status message and the Buffer Status Report (BSR); and
receiving a service data units (SDUs) on a downlink, the SDUs based, at least in part, on the PDCP status message.

47. The method of claim 45, wherein initiating communication comprises transmitting a Random Access Channel (RACH), with a dedicated preamble to start communication with the target cell.

48. An apparatus for wireless communication handoff, the apparatus comprising:
means for receiving target cell information to start handover negotiations;
means for initiating communication with a target cell using the target cell information;
means for receiving a handover message comprising a Radio Link Control (RLC) status report in a same transmitter time interval (TTI); and
means for using the received information to approximate status reporting.

49. A computer program product, comprising:
a non-transitory computer-readable medium comprising:
code receiving target cell information to start handover negotiations;
code for initiating communication with target cell using the target cell information;
code for receiving a handover message comprising a Radio Link Control (RLC) status report in a same transmitter time interval (TTI); and
code for using the received information to approximate status reporting.

50. An apparatus for wireless communication handoff, the apparatus comprising:
- at least one processor configured to
- receive target cell information to start handover negotiations;
- initiate communication with a target cell using the target cell information;
- receive at least one of a handover message comprising a Radio Link Control (RLC) status report in a same transmitter time interval (TTI); and
- use the received information to approximate status reporting.

* * * * *